United States Patent Office 3,100,705
Patented Aug. 13, 1963

3,100,705
HONEY BEVERAGE AND PROCESS
FOR MAKING IT
Stuart L. Adams, Anchorage, and George V. Niesen, Louisville, Ky., assignors to Joseph E. Seagram & Sons, Inc., New York, N.Y., a corporation of Indiana
No Drawing. Filed Oct. 3, 1960, Ser. No. 59,795
10 Claims. (Cl. 99—29)

The present invention relates to an alcoholic beverage produced from honey and to a process for making it including an improved method of fermenting naturally occurring honey.

Fermentation of various sugars to produce alcoholic beverages has been well known for many years. In such fermentations certain yeasts are employed which exhibit a marked ability to change sugar into alcohol and carbon dioxide. These yeasts are classified as unicellular plants. In common with other forms of living matter they depend for growth upon suitable nutrition, including sources of carbon, nitrogen, hydrogen, oxygen and various minerals such as calcium, phosphorus, sulfur, magnesium and potassium.

Honey, the sweet, viscid liquid elaborated by honeybees from nectar collected by them from flowers, has been fermented since ancient times using various techniques. The undistilled products of these fermentations have been known by various names including mead and hydromel.

Mead however has not gained acceptance as a beverage. Although sweet tasting due to the presence in it of unfermented sugars mead has had a generally undesirable flavor, one important cause of this being a lack of the proper types and amounts of nutrients for the yeasts added to the honey to promote efficient fermentation. As a result the fermentation process had to be continued such as a long period of time that some of the yeast cells ruptured or autolyzed, thereby giving rise to the development of an undesirable flavor in the resulting liquor. This undesirable flavor is derived from the autolysis products themselves as well as from infection by undesirable bacteria which invariably occurs after autolysis.

While natural honey contains a high concentration of fermentable sugars it has an inadequate supply of yeast nutrient in relation to its sugar content. In this respect fermentation of honey is unlike that of grain in which the natural nutrients present are usually adequate to promote the proper type and rate of fermentation. Not only is the supply of yeast nutrient naturally present in honey low but the composition and fermentation qualities of such nutrients vary widely because of the diverse floral origins of the nectar from which the honey is made.

Because of the inherent limitations in naturally occurring honey previously known methods of fermenting it have required time periods lasting for several weeks and often up to and in excess of one month. Even then the fermentations have been unsuccessful, both because of incomplete utilization of the sugars present in the honey and eventual rupture of the yeast cells present resulting in the liberation of unpleasant flavorings. Nutrient supplements such as phosphates, potassium, magnesium and ammonia have been added to the honey prior to fermentation, as have special yeasts, but with little success. The fermentation products so formed have been either unpalatable or so lacking in pleasant taste as to be undesirable. It has simply been impossible to retain in the fermented products the desired floral fragrances originally present in the natural honey while at the same time avoiding introduction of new and unpleasant flavorings during the fermentation process itself.

It is a primary object of the invention to provide a potable alcohol beverage which has been distilled from fermented honey, which beverage retains the various floral essences which have been collected into the honey. An allied object is to provide such an alcoholic beverage which includes along with the floral essences from the honey certain congeneric substances of pleasing flavor and essence produced during fermentation by maintaining control over the metabolism of the yeasts present.

Another and equally important object of the invention is to provide a process for making the beverage, which includes an improved honey fermentation method whereby the rate of fermentation is materially increased so that complete or substantially complete fermentation is achieved in a matter of a few days' time rather than the many weeks previously required. An ancillary object is to provide a fermentation process in which the fermentable sugars in the honey are virtually completely utilized by the fermenting yeast in less than about ten days' time, thereby preventing rupture of the yeast cells and thus avoiding liberation therefrom of congeners having unpleasant flavors.

A further object is to provide a tasteful and palatable alcoholic beverage obtained by distilling the mixture resulting from rapid fermentation of honey in the presence of a carefully selected yeast nutrient. Another object is to provide a new and improved composition of fermented honey which may be distilled to produce as a distillate the alcoholic beverage described herein.

Natural honey as it passes in commerce is the unadulterated product of the honeybee and comprises about 85–90% of various sugars by weight. In some honeys the sugars make up as much as 99% of the solids.

Briefly described, the novel alcoholic beverage is produced by (1) diluting natural honey with water, (2) fortifying the honey in water solution with a carefully selected yeast nutrient, (3) yeasting the honey-nutrient mixture with any of various known yeasts, (4) incubating the yeasted honey-nutrient mixture until fermentation is complete, (5) distilling the resulting fermented mixture and (6) collecting the distillate which becomes the new alcoholic beverage.

The first step of the process, dilution of the honey, may be carried out in any known manner. Honey as obtained from the honeycomb is diluted with water such that the resultant sugar content is about 12–18 percent by weight of the total mixture. The honey in water solution is mixed to assure its uniformity.

The exact sugar concentration chosen for the solution will depend upon various factors including the nature of the particular yeast employed and the concentration of alcohol desired as well as the type of honey used. In any event it will be desirable to dilute the honey to an extent such that the mixture or liquor after fermentation will contain about 6–9 percent alcohol by volume. Lower alcohol concentrations will require the use, later, of distilling equipment of greater capacity than would normally be desired. High sugar concentrations during fermentation undesirably slow down the rate of yeast growth and, consequently, the rate of fermentation. Moreover some of the sugar will remain unfermented if the alcohol tolerance of the yeast is reached. In general we prefer to dilute the honey to about 16 percent sugar by weight.

Fortification of the honey in water solution is accomplished by adding the required amounts of nutrient to the mixture and agitating as required to again assure arrival at a uniform mixture.

Yeasting is accomplished by initially growing cells of the yeast to be used in the nutrient medium and transferring the actively growing yeast into the nutrient containing honey mixture. Various known yeasts may be employed, preferably those chosen from the commonly used wine, beer and whiskey fermentation yeasts. For example certain yeast strains from the groups of *Saccharomyces cerevisiae* and *Saccharomyces carlbergensis* are useful.

Incubating the yeasted honey-nutrient mixture constitutes holding or maintaing the mixture under such conditions that fermentation commences and for a period of time long enough for it to proceed to completion. It is usually preferred to maintain the temperature during fermentation in a fairly narrow range, e.g. 82–86° F.

Finally the entire fermented mixture or liquor is heated to its boiling point using any standard distillation equipment, the evolving vapors being condensed and collected as a distillate. The boiling range for the distillate fraction may be selected to give the desired beverage flavor and alcoholic strength. For example a honey product analogous to whiskey or to brandy may be produced in this way if desired.

The present invention is based, in part, on our discovery that the use with known yeasts of a particular and carefully selected nutrient material greatly improves the efficiency and rate of fermentation and thereby avoids autolysis of the yeast cells and the undesirable flavors which result therefrom. More specifically, we have discovered that addition to the honey in water solution of a small amount of the dried soluble residue from the distillation of fermented grain mashes, commonly known as "corn distiller's dried solubles," results in a drastic reduction in the time required for obtaining essentially complete conversion by the yeast of the sugar content of the honey into alcohol and carbon dioxide.

The material "corn distiller's dried solubles" is described in definition #83 adopted by the American Feed Control Officials in 1951 as the product obtained in the manufacture of distilled liquors and alcohol from corn, or from a grain mixture in which corn predominates, by condensing and drying the screened stillage obtained therefrom.

We have discovered that addition to the diluted honey of "corn distiller's dried solubles" in an amount of from about 2.0 to about 5.0 percent based on the weight of the natural honey before dilution speeds up the fermentation rate remarkably as compared with rates obtained using prior known honey nutrients. Higher proportions of the "corn distiller's dried solubles" may be used if desired but are unnecessary. Too high a nutrient concentration, however, may adversely affect the flavor of the final distilled beverage. Concentrations of nutrient lower than about 3.0 percent (by weight of the undiluted honey) will shorten the fermentation time although to a less desirable extent. The 3.0 percent figure represents a practical minimum concentration at which the fermentation can be expected to be complete or substantially complete within an elapsed fermentation time of about ten days.

The following examples are illustrative of the substantial reduction in the time required for fermentation when the dried solubles are used as nutrients. In Examples I and II a comparison is given between the rates of honey fermentation obtained using the dried solubles nutrient and those obtained using certain previously known nutrients in known proportions.

In both examples the rates of fermentation were followed by measurement of the specific gravities of the fermenting mixtures in terms of their Balling degree readings. The Balling degree, named after the German scientist who established it, gives the specific gravity of a fermenting mixture or solution in terms of that of a cane sugar solution consisting of one pound of cane sugar dissolved in enough water to make 100 pounds of solution. It will be understood that the Balling reading does not give the exact percentage of sugar present in a fermenting mix at any given time since is does not directly take into account changes in the specific gravity of the solution resulting from the production therein of alcohol which has a lower specific gravity than water. For example the Balling reading, which is 0 at 0% sugar in a water solution, may be a negative value (less than 0) in an alcohol-water solution in which the sugar or part of it has been consumed by fermentation. Nevertheless, and importantly, the rate of change of the Balling reading with time gives a positive indication of the rate at which fermentation is proceeding.

*Example I*

Clover honey was diluted with water such that the resultant sugar content was between 15 and 17 percent by weight. To five aliquot portions of this solution were added quantities of "corn distiller's dried solubles," in finely divided particle form, varying from 1 to 5 percent of the weight of the honey before dilution with water.

Another portion of clover honey was similarly diluted with water (to a sugar content between 15 and 17 percent) and to this solution was added approximately 3.3 percent (based on the undiluted weight of honey) of a mixture of mineral salts comprising approximately 1 part by weight $MgSO_4$, 2 parts by weight $K_2HPO_4$ and 11 parts by weight $(NH_4)_2SO_4$, which salts have previously been known and used in these proportions and quantities as nutrients in honey fermentations.

Each of the fortified honey mixtures was then yeasted with the same strain of the yeast genus Saccharomyces and species *cerevisiae*. Fermentation temperatures were controlled in the range of 82–86° F. The results in terms of Balling readings obtained after the indicated number of days' fermentation time are given in the table below. As noted above, a Balling reading of near zero, or a negative number, indicates complete or substantially complete conversion of the sugars present to alcohol.

| Nutrient | Amount,[1] percent | Balling readings after— | | |
|---|---|---|---|---|
| | | 7 days | 8 days | 9 days |
| Corn distiller's dried solubles | 1.0 | 8.7 | 7.7 | 7.0 |
| Do | 2.0 | 5.5 | 4.3 | 3.1 |
| Do | 3.0 | 3.4 | 2.1 | 0.7 |
| Do | 4.0 | 2.1 | 0.7 | −0.8 |
| Do | 5.0 | 1.1 | −0.4 | −1.0 |
| Mixture of $(NH_4)_2SO_4$, $K_2HPO_4$, and $MgSO_4$ | 3.3 | 9.9 | 9.2 | 9.2 |

[1] Based on weight of undiluted honey.

As will be seen, the Balling reading using the salt mixture as nutrient was 9.9 after 7 days' fermentation and had dropped only to 9.2 after an additional two days. It will be understood of course that the original Balling reading of the unfermented mixture was approximately 15–17 corresponding to the percentage of sugar originally present in the diluted solution. In marked contrast to this the fermented mix in which 2.0 percent of dried solubles was employed showed a Balling reading of only 5.5 after 7 days and had dropped to 3.1 after an additional two days. The fermented mix in which 3.0 percent of dried solubles was employed showed a Balling reading of only 3.4 after 7 days and had dropped to 0.7

(i.e. fermentation was substantially complete) after an additional two days. In the mixes in which higher proportions of dried solubles were employed fermentation was complete after only eight days.

*Example II*

Yucatan honey was diluted with water as in Example I and to this solution was added 5.0 percent (based on the weight of honey before dilution with water) of "corn distiller's dried solubles."

Another portion of Yucatan honey was similarly diluted and fortified with 3.3 percent (based on undiluted weight of honey) of the same salt mixture used in Example I.

Aliquot portions of each of the fortified honey mixtures were then yeasted with each of five different yeasts, all of which are known to be effective for grain fermentation. The yeasts employed (yeast Nos. 1 through 5 in the table below) were different strains of the genus Saccharomyces, three of them (Nos. 3, 4 and 5) having been of the species *cerevisiae*, one (No. 1) of the species *carlbergensis* and one (No. 2) unidentified as to species. The results in terms of Balling readings obtained after the indicated number of days' fermentation time are given in the following table.

| Yeast No. | 5.0% dried solubles nutrient | | 3.3% mineral salts nutrient | |
|---|---|---|---|---|
| | Fermentation time (days) | Balling reading (degrees) | Fermentation time (days) | Balling reading (degrees) |
| 1 | 8 | −0.9 | 27 | 7.9 |
| 2 | 7 | −0.7 | 43 | 8.2 |
| 3 | 7 | −0.4 | 23 | 6.7 |
| 4 | 7 | −0.8 | 33 | 8.6 |
| 5 | 6 | −0.9 | 19 | 5.0 |

The fermentation times given for the dried solubles fermentations are for the earliest times at which no further decrease in Balling degrees were observed.

Each of the fermented liquors from Example I made using 2.0 through 5.0 percent dried solubles as yeast nutrient and from Example II made using 5.0 percent dried solubles was separately distilled in standard laboratory type distillation apparatus and a distillate fraction collected. The individual distillate fractions were submitted to an organoleptic evaluation by a panel of taste and odor experts. The beverages were deemed to be of perfect balance and desirable flavor and received the highest ratings by the panel. As such the beverages were found to have retained the various floral essences of the source honey and it is believed that the flavors were additionally enhanced by congeneric substances produced from the yeast and nutrient during the fermentation process.

The presently preferred embodiments of the invention have been described in some detail in order to enable those skilled in this field to comprehend fully the principles using only the ordinary skills of their specialty. No inference should be drawn, however, from the detailed character of the description that the invention is limited in its employment to any such details of procedure. On the contrary, a wide variety of embodiments are possible, as will readily occur to those skilled in this field and the intention is to cover all methods, alternatives, substitutions and equivalents falling within the spirit and scope of the invention as expressed in the appended claims.

Having thus described our invention, what we claim as novel and desire to protect by Letters Patent is as follows:

1. The process of producing a potable alcoholic beverage which comprises diluting natural honey with water to form a solution containing about 12 to 18 percent sugar, adding to said solution an amount of corn distiller's dried solubles equal to about 3 to 5 percent by weight of the honey before dilution with water, adding yeast to the mixture, holding the mixture for not more than about 10 days until fermentation of the sugar to alcohol is substantially complete, distilling the resulting fermented natural honey liquor, and collecting the distillate for use as a beverage.

2. The process of producing a potable alcoholic beverage which comprises adding water to natural honey to form a solution of about 12 to 18 percent sugar in water, adding to said solution an amount of corn distiller's dried solubles equal to at least about 2 percent by weight of the honey before dilution with water, adding yeast to the mixture, holding the mixture for not more than about 10 days until fermentation of the sugar to alcohol is substantially complete, distilling the resulting fermented natural honey liquor, and collecting the distillate for use as a beverage.

3. The process of producing a potable alcoholic beverage which comprises adding water to natural honey to form a solution of about 12 to 18 percent sugar in water, adding to said solution an amount of corn distiller's dried solubles equal to at least about 2 percent by weight of the honey before dilution with water, adding yeast to the mixture, holding the mixture until fermentation of the sugar to alcohol is substantially complete, distilling the resulting fermented natural honey liquor, and collecting the distillate for use as a beverage.

4. The process of producing a potable alcoholic beverage which comprises adding water to natural honey to form a solution of about 12 to 18 percent sugar in water, adding to said solution an amount of yeast nutrient in the form of corn distiller's dried solubles equal to at least about 1 percent by weight of the honey before dilution with water, adding yeast to the mixture, holding the mixture until fermentation of the sugar to alcohol is substantially complete, distilling the resulting fermented natural honey liquor, and collecting the distillate for use as a beverage.

5. The process of producing a potable alcoholic beverage which comprises adding water to natural honey to form a solution of about 12 to 18 percent sugar in water, adding to said solution corn distiller's dried solubles, adding yeast to the mixture, the amount of added corn distiller's dried solubles being sufficient to effect, along with the yeast present, substantially complete fermentation of the sugar to alcohol after not more than about 10 days' fermentation time, holding the mixture for not more than about 10 days until fermentation of the sugar to alcohol is substantially complete, distilling the resulting fermented natural honey liquor, and collecting the distillate for use as a beverage.

6. The process of fermenting honey which comprises diluting natural honey with water to form a solution containing about 12 to 18 percent sugar, adding to said solution an amount of corn distiller's dried solubles equal to about 3 to 5 percent by weight of the honey before dilution with water, adding yeast to the mixture, and holding the mixture for not more than about 10 days until fermentation of the sugar to alcohol is substantially complete.

7. The process of fermenting honey which comprises adding water to natural honey to form a solution of about 12 to 18 percent sugar in water, adding to said solution an amount of corn distiller's dried solubles equal to at least about 2 percent by weight of the honey before dilution with water, adding yeast to the mixture, and holding the mixture for not more than about 10 days until fermentation of the sugar to alcohol is substantially complete.

8. The process of fermenting honey which comprises adding water to natural honey to form a solution of about 12 to 18 percent sugar in water, adding to said solution an amount of corn distiller's dried solubles equal to at least about 2 percent by weight of the honey before dilution with water, adding yeast to the mixture, and holding the mixture until fermentation of the sugar to alcohol is substantially complete.

9. The process of fermenting honey which comprises adding water to natural honey to form a solution of about 12 to 18 percent sugar in water, adding to said solution an amount of yeast nutrient in the form of corn distiller's dried solubles equal to at least about 1 percent by weight of the honey before dilution with water, adding yeast to the mixture, and holding the mixture until fermentation of the sugar to alcohol is substantially complete.

10. The process of fermenting honey which comprises adding water to natural honey to form a solution of about 12 to 18 percent sugar in water, adding to said solution corn distiller's dried solubles, adding yeast to the mixture, the amount of added corn distiller's dried solubles being sufficient to effect, along with the yeast present, substantially complete fermentation of the sugar to alcohol after not more than about 10 days' fermentation time, and holding the mixture for not more than about 10 days until fermentation of the sugar to alcohol is substantially complete.

References Cited in the file of this patent

UNITED STATES PATENTS

| | | |
|---|---|---|
| 754,461 | Kouba | Mar. 15, 1904 |
| 2,663,667 | Acott | Dec. 22, 1953 |

OTHER REFERENCES

Chemical Abstracts, vol. 49, 1955, page 11949(a).